(12) United States Patent
Tasaki

(10) Patent No.: US 9,895,749 B2
(45) Date of Patent: Feb. 20, 2018

(54) PEELING MACHINE

(71) Applicant: DAISHO SEIKI CORPORATION, Nishinomiya-shi (JP)

(72) Inventor: Hidetoshi Tasaki, Nishinomiya (JP)

(73) Assignee: DAISHO SEIKI CORPORATION, Nishinomiya-shi (JP)

( * ) Notice: Subject to any disclaimer, the term of this patent is extended or adjusted under 35 U.S.C. 154(b) by 0 days.

(21) Appl. No.: 15/033,957

(22) PCT Filed: Apr. 22, 2014

(86) PCT No.: PCT/JP2014/061308
§ 371 (c)(1),
(2) Date: May 3, 2016

(87) PCT Pub. No.: WO2015/162693
PCT Pub. Date: Oct. 29, 2015

(65) Prior Publication Data
US 2016/0279714 A1    Sep. 29, 2016

(51) Int. Cl.
*B23B 5/12* (2006.01)
(52) U.S. Cl.
CPC ..................... *B23B 5/12* (2013.01)
(58) Field of Classification Search
CPC .............. B23B 3/26; B23B 5/08; B23B 5/12
See application file for complete search history.

(56) References Cited

U.S. PATENT DOCUMENTS 2,300,967 A * 11/1942 Reed .................. B23B 5/00
407/120
4,259,884 A * 4/1981 Hartkopf .............. B23B 5/12
408/159

(Continued)

FOREIGN PATENT DOCUMENTS

JP      61103702 A  *  5/1986  ............... B23B 5/12
JP      02212001 A  *  8/1990  ............... B23B 5/12

(Continued)

*Primary Examiner* — Sara Addisu
(74) *Attorney, Agent, or Firm* — Kratz, Quintos & Hanson, LLP

(57) ABSTRACT

To provide a peeling machine being able to easily and swiftly conduct production process and preparation work, excellent in durability, and able to certainly prevent movement of a tool holder to a radial inner side by self weight, a peeling machine is provided with a rotation cylinder 1 to which a work W of round rod is inserted, a tool holder 22 attached to the rotation cylinder 1 as to freely slide along a radial direction R of the rotation cylinder 1, and a pressing member 3 attached to the rotation cylinder 1 as to freely slide along an axial direction X of the rotation cylinder 1; and constructed as that a pressing face 32a of the pressing member 3 and a pressure-receiving face 22a of the tool holder 22 are made sliding with inclination on a longitudinal face parallel to a sliding direction Y of the tool holder 22, and the tool holder 22 is made sliding to a radial inner side Rb on the longitudinal face by sliding the pressing member 3 to an axial outer side Xa; and, a hook member 6, hitching the tool holder 22 as to prevent sliding of the tool holder 22 to the radial inner side Rb by self weight, is attached to the pressing member 3.

4 Claims, 6 Drawing Sheets

(56) References Cited

U.S. PATENT DOCUMENTS 4,295,397 A * 10/1981 Schweer .................. B23B 5/12
                                                    29/27 R
4,393,675 A *  7/1983 Azarevich ................ B23B 5/12
                                                    29/90.01
4,408,472 A * 10/1983 Azarevich ................ B23B 5/12
                                                    29/90.01

FOREIGN PATENT DOCUMENTS

| JP | 04331005  A | * | 11/1992 | ............... B23B 5/12 |
| JP | 2002001603 A | * | 1/2002 | ............... B23B 5/12 |
| JP | 2009050924 A | * | 3/2009 | |

* cited by examiner

PEELING MACHINE

FIELD OF THE INVENTION

This invention relates to a peeling machine.

BACKGROUND ART

A conventional peeling machine is provided with a rotation cylinder to which a work of round rod is inserted, and a tool holder attached to the rotation cylinder and freely slidable along the radial direction of the rotation cylinder (refer to patent document 1, for example).

This conventional peeling machine, as shown in FIG. 7, is provided with a pressing member 93 attached to a rotation cylinder 90 and freely slidable along an axial direction X of the rotation cylinder 90, and constructed as that a pressing face 93a of the pressing member 93 and a pressure-receiving face 92a of the tool holder 92 are made sliding with inclination on a longitudinal face parallel to a sliding direction Y of the tool holder 92, and the tool holder 92 is moved to a radial inner side Rb on the longitudinal face by sliding the pressing member 93 to an axial outer side Xa.

Further, to solve the problem that a cutting tip 95 and the tool holder 92 are damaged because the tool holder 92 on an upper position after the rotation slides downward (to the radial inner side Rb) by self weight and contacts other tool holders, a hitching member 98, always elastically pushed to the radial outer side Ra by a spiral spring 99, is disposed on a base member 91 attached to the rotation cylinder 90 and holding the tool holder 92 as to freely slide along the radial direction R, the hitching member 98 is hitched to an end portion of a back face groove 92g of the tool holder 92, and the tool holder 92 is always elastically pushed to the radial outer side Ra to prevent the movement to the radial inner side Rb by self weight.

PRIOR ART DOCUMENT

Patent Document

Patent document 1: Japanese Patent Provisional Publication NO. 2009-50924.

OUTLINE OF THE INVENTION

Problems to be Solved by the Invention

However, in a large peeling machine to cut a work of which diameter is over 100 mm, a spiral spring having strong elasticity is used for a large and heavy tool holder. So it is difficult to confirm whether the tool holder can smoothly slide in production process and preparation work before the cutting work, and the production causes much labor and time for the complicated construction.

And, abrasion tends to be generated on the pressing face of the pressing member and the pressure-receiving face of the tool holder because the pressing member is pressed to the tool holder to slide by strong force against the elastic force of the spiral spring.

Further, in a case that the tool holder is moved to the radial outer side to cut a work larger than that of the previous cutting work, sliding resistance of the tool holder is increased by fine cut chip, the tool holder is not moved to the radial outer side by the elastic force of the spiral spring, and the end portion of the work contacts the tool holder as to generate deformation and brake when a work larger than that of the previous cutting work is fed in the state that escape of the tool holder is not made.

Therefore, it is an object of the present invention to provide a peeling machine being able to easily and swiftly conduct the production process and the preparation work, excellent in durability, and able to certainly prevent the movement of the tool holder to the radial inner side by self weight.

Means for Solving the Problems

To achieve the object above, the peeling machine of the present invention is a peeling machine provided with a rotation cylinder to which a work of round rod is inserted, a tool holder attached to the rotation cylinder as to freely slide along a radial direction of the rotation cylinder, and a pressing member attached to the rotation cylinder as to freely slide along an axial direction of the rotation cylinder; and constructed as that a pressing face of the pressing member and a pressure-receiving face of the tool holder are made sliding with inclination on a longitudinal face parallel to a sliding direction of the tool holder, and the tool holder is made sliding to a radial inner side on the longitudinal face by sliding the pressing member to an axial outer side; and, a hook member, hitching the tool holder as to prevent sliding of the tool holder to the radial inner side by self weight, is attached to the pressing member.

And, the tool holder has a hitched face hitched to the hook member parallel to the pressure-receiving face on the longitudinal face.

And, the hook member has a hitching face hitched to the tool holder parallel to the pressing face of the pressing member on the longitudinal face.

Effects of the Invention

According to the present invention, the sliding of the tool holder can be made smooth and stable. Production process such as adjustment of the sliding resistance of the tool holder and cutting preparation work can be conducted easily and swiftly. Durability of the tool holder and the pressing member can be improved. The disadvantage generated by the movement of the tool holder to the radial inner side by self weight can be certainly prevented, and the working can be made safe.

EMBODIMENTS OF THE INVENTION

The present invention is described with an embodiment shown in accompanying drawings.

Figure 1:
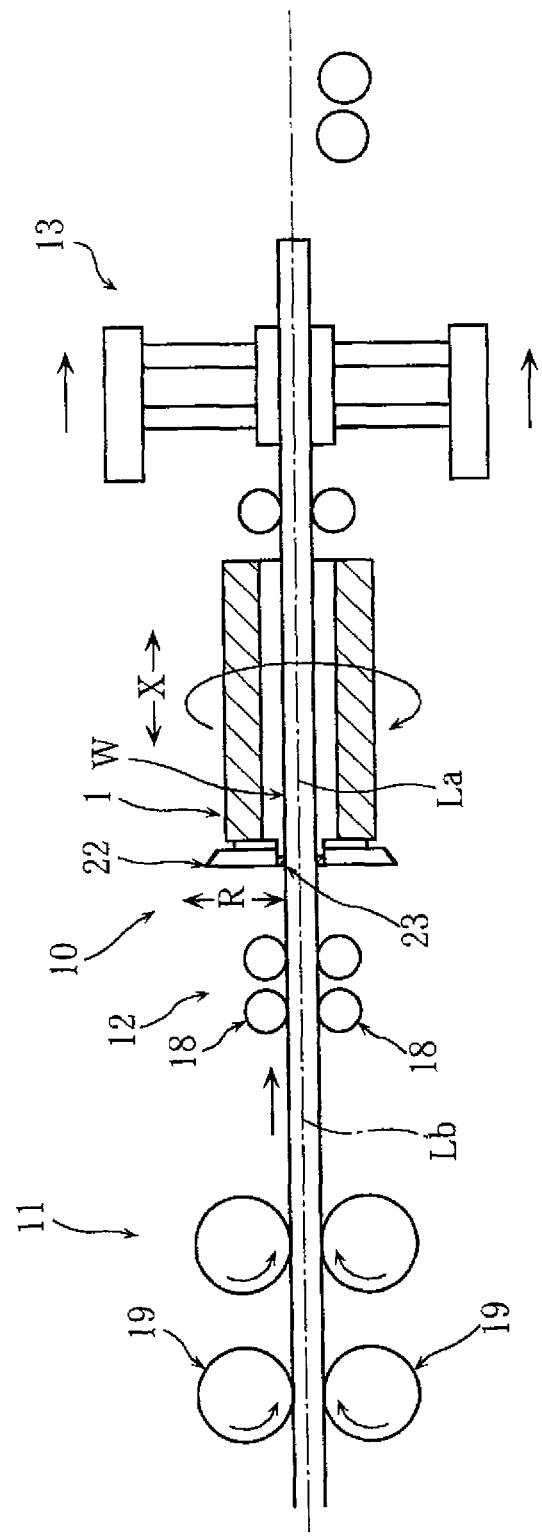
FIG. 1 A simplified side view showing an embodiment of a peeling machine of the present invention.

A peeling machine relating to the present invention, as shown in FIG. 1, is provided with a cutting device 10 having a rotation cylinder 1 to which a metal work W of round rod is inserted and rotated around a rotation axis La by a motor, a tool holder 22 attached to the rotation cylinder 1 to rotate around the rotation axis La and to which a cutting tip 23 is attached to cut a peripheral face of the work W, further, the peeling machine is provided with a feeding device 11 provided with two pairs of upper and lower feeding rollers 19 to feed the work W to the rotation cylinder 1, a guiding device 12 provided with plural guiding rollers 18 to make a work axis Lb of the work W fed by the feeding device 11 concentric with the rotation axis La, and a carriage device 13 to clamp the work W inserted to the rotation cylinder 1 from upper and lower directions to draw out of the rotation cylinder 1.

Figure 2:
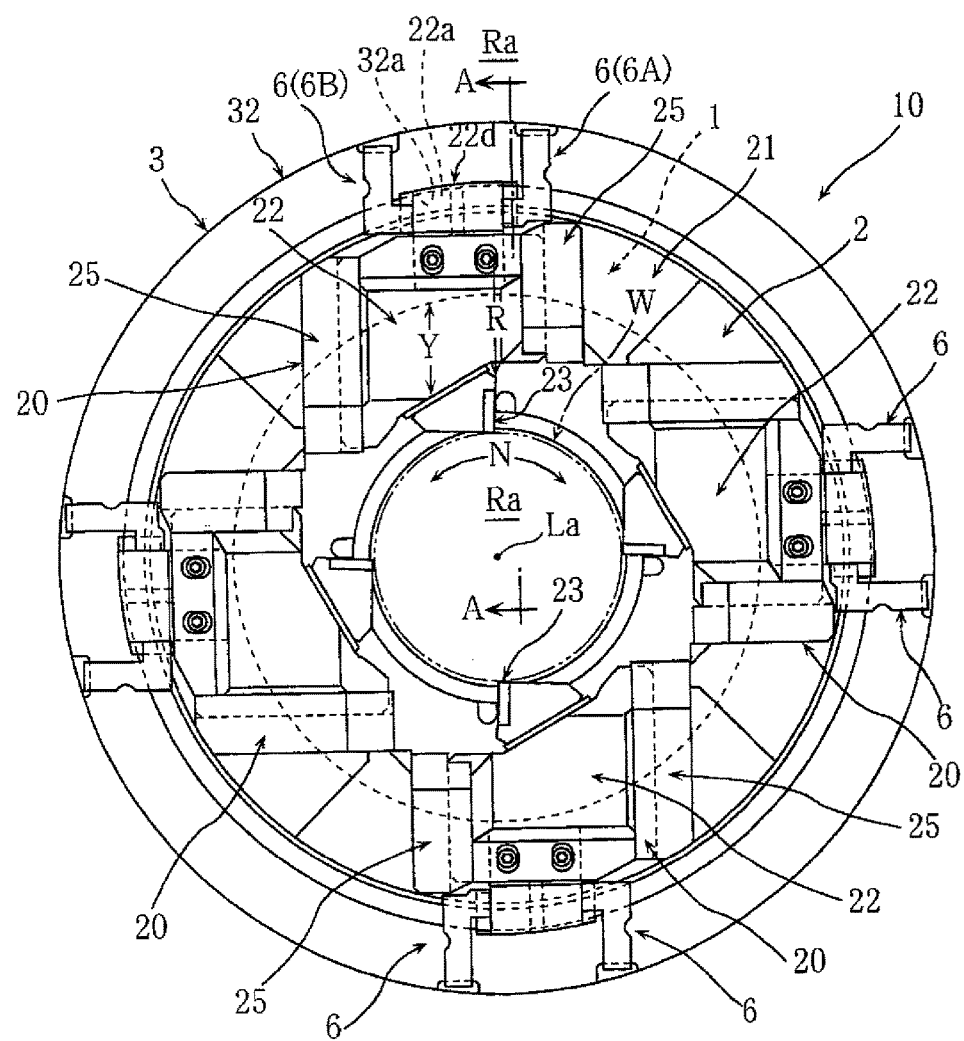
FIG. 2 A front view of a principal portion of a cutting device.
Figure 3:
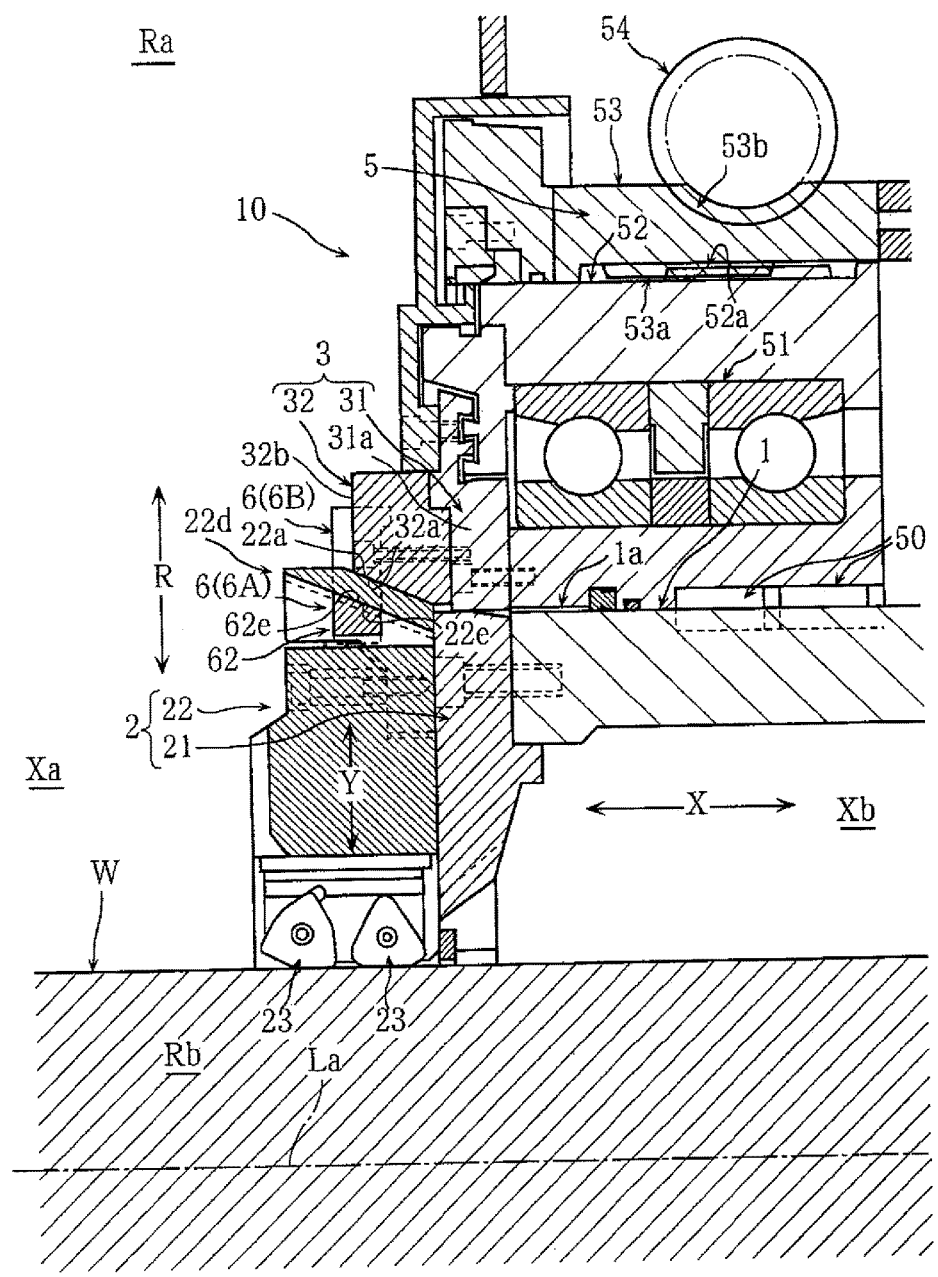
FIG. 3 A cross-sectional view of FIG. 2 on A-A line.

The cutting device 10, as shown in FIG. 2 and FIG. 3, is provided with a cutter head 2 having the tool holder 22 and attached to the rotation cylinder 1 to rotate around the rotation axis La, a pressing member 3 receiving rotational force of the rotation cylinder 1 to rotate around the rotation axis La and mounted as to freely slide in an axial direction X of the rotation cylinder 1, and a sliding mechanism 5 to slide the pressing member 3 in the axial direction X.

The cutter head 2 is provided with plural tool holders 22 to each of which a cutting tip 23 to cut the work W of round rod is attached, a pair of slide guiding members 25 to hold each of the tool holders 22 as to freely slide (freely position-adjustable in the diameter direction) along a radial direction R of the rotation cylinder 1 and prevent the tool holder 22 from moving in the axial direction X of the rotation cylinder 1, and a base member 21 of ring attached to an end face of an end portion 1a of the rotation cylinder 1 to which the slide guiding members 25 are attached.

The end portion 1a is an end portion to which the work W is inserted, or an end portion on an upstream side of work feeding direction. The radial direction R of the rotation cylinder 1 is also the radial direction R of the work W and the radial direction R of the cutter head 2.

On the cutter head 2, a cutting unit 20, provided with one tool holder 22 and one pair of slide guiding members 25, is disposed on 4 positions with uniform intervals on the base member 21 in a peripheral direction N around the rotation axis La.

The tool holder 22 is inserted to a dovetail guiding groove formed along the radial direction R with the pair of slide guiding members 25 and the base member 21 as to freely slide.

The cutting tip 23 is attached to a forth end side (a radial inner side Rb of the rotation cylinder 1) of the tool holder 22, and the edge of the cutting tip 23 is moved in the radial direction R when the tool holder 22 is moved in a sliding direction Y along the radial direction R.

And, the base end side (a radial outer side Ra of the rotation cylinder 1) of the tool holder 22 has an inclined pressure-receiving face 22a on a longitudinal face parallel to the sliding direction Y of the tool holder 22 as shown in FIG. 3. In other words, a base end portion 22d of the tool holder 22 has the pressure-receiving face 22a inclined to the radial inner side Rb toward the axial inner side Xb. The pressure-receiving face 22a is formed arc-shaped in front view (in a cross-sectional face parallel to the sliding direction Y of the tool holder 22). The sliding direction Y of the tool holder 22 is also called holder sliding direction Y in some cases. The longitudinal face parallel to the holder sliding direction Y is parallel to the rotation axis La, and the cross-sectional face parallel to the sliding direction Y is at right angles with the rotation axis La.

The pressing member 3, provided with a cylindrical sliding member 31 mounted to the rotation cylinder 1 as to freely slide in the axial direction X and to which rotational force of the rotation cylinder 1 is transmitted by keys 50 fixed to the rotation cylinder 1, and a pressing ring 32 of ring attached to an end portion 31a of the sliding member 31 and concentric with the base member 21 of the cutter head 2, is attached to the peripheral face of the end portion 1a of the rotation cylinder 1.

The pressing ring 32 has a pressing face 32a inclined on the longitudinal face parallel to the holder sliding direction Y. In other words, the pressing ring 32 has a tapered inner peripheral face diminishing toward the axial inner side Xb, and the pressing face 32a is formed with the tapered inner peripheral face.

The pressing face 32a and the pressure-receiving face 22a of the tool holder 22 are sliding with inclination on the longitudinal face parallel to the holder sliding direction Y (refer to FIG. 3). And, the pressing face 32a contacts the pressure-receiving face 22a with an arc shape on the cross-sectional face parallel to the sliding direction Y.

Figure 4:
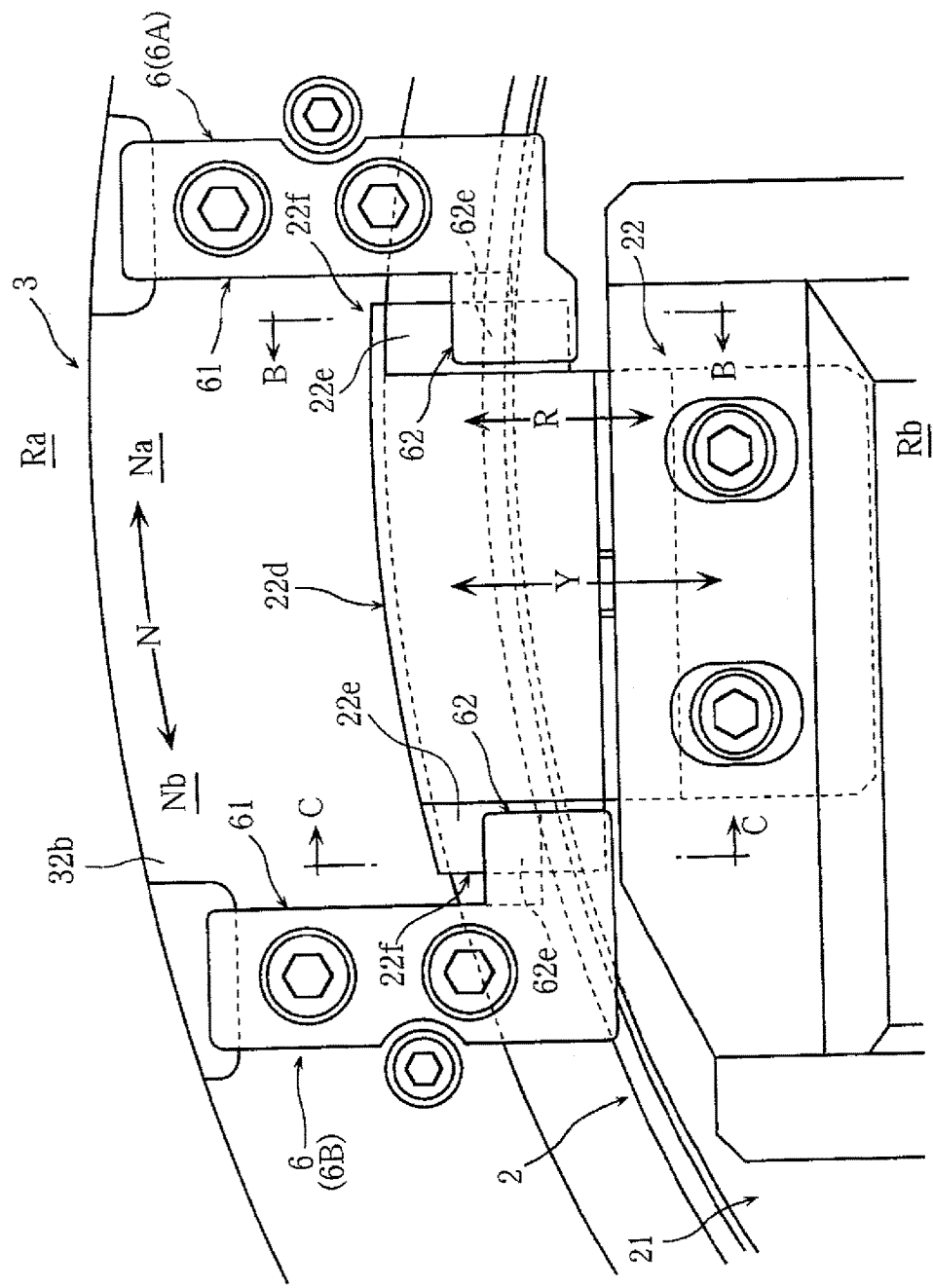
FIG. 4 An enlarged front view of a principal portion.
Figure 5:
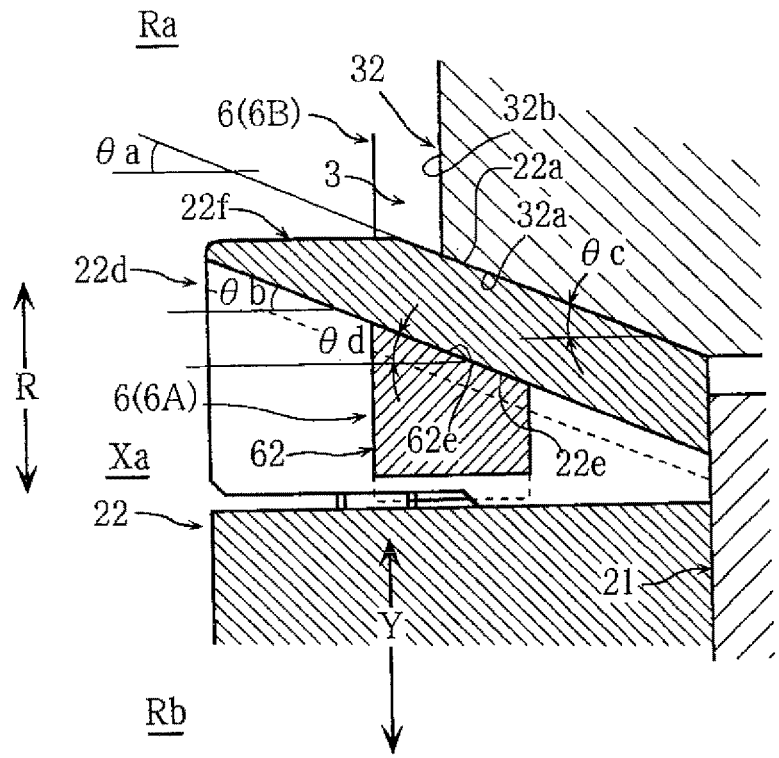
FIG. 5 A cross-sectional view of FIG. 4 on B-B line.
Figure 6:
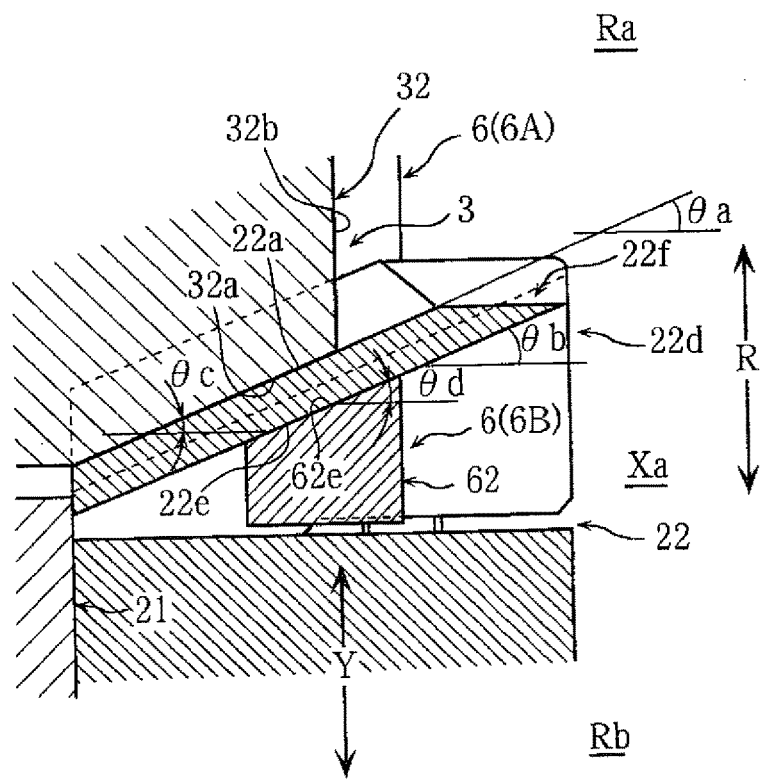
FIG. 6 A cross-sectional view of FIG. 4 on C-C line.

And, as shown in FIG. 4 through FIG. 6, a hook member 6 to hitch the base end portion 22d (the radial outer end portion) of the tool holder 22 as to stop the movement of the tool holder 22 to the radial inner side Rb by self weight in a stopped state of the rotation cylinder 1 is attached to the pressing member 3.

Two hook members 6 are disposed on both sides (on left and right sides) of the base end portion 22d of the tool holder 22 in the peripheral direction N as one pair. That is to say, a first hook member 6A on one side in the peripheral direction and a second hook member 6B on another side Nb in the peripheral direction hitch the tool holder 22 in the peripheral direction N.

The base end portion 22d of the tool holder 22 is formed T-shaped in front view having hitched portions 22f protruding in the peripheral direction N to be hitched to the hook member 6.

The hitched portion 22f has a hitched face 22e formed parallel to the pressure-receiving face 22a on the longitudinal face parallel to the holder sliding direction Y shown in FIG. 5 and FIG. 6.

That is to say, on the longitudinal face, an inclination angle (first inclination angle) θa between a standard face at right angles with the longitudinal face and the pressure-receiving face 22a is set to be the same as an inclination angle (second inclination angle) θb between the standard face and the hitched face 22e.

The hitched face 22e is disposed on the radial inner side Rb to the pressure-receiving face 22a on the longitudinal face.

The hook member 6 is formed L-shaped in front view having an attachment portion 61 attached to an end face (front face) 32b of the pressing ring 32 and a hitching portion 62 hitching to the hitched face 22e of the tool holder 22.

The hitching portion 62 of the hook member 6 contacts the hitched portion 22f of the tool holder 22 from the radial inner side Rb. That is to say, the hitching portion 62 contacts the hitched portion 22f from the lower side to support by suspension in a posture in which the sliding direction Y of the tool holder 22 is vertical and the base end portion 22d is on the upper position.

The hook member 6 stops the movement of the tool holder 22 on the upper position by self weight toward the radial inner side Rb in a state that the rotation cylinder stays still.

The tool holder 22 on the upper position means the tool holder 22 in which the edge of the cutting tip 23 is disposed on an upper position than a horizontal face including the rotation axis La.

The hitching portion 62 of the hook member 6 has a hitching face 62e formed parallel to the pressing face 32a of the pressing member 3 (the tapered inner peripheral face of the pressing ring 32) on the longitudinal face (refer to FIG. 5 and FIG. 6) parallel to the holder sliding direction Y.

That is to say, on the longitudinal face, an inclination angle (third inclination angle) θc between the standard face at right angles with the longitudinal face and the pressing face 32a is set to be the same as an inclination angle (fourth inclination angle) θd between the standard face and the hitching face 62e.

The hitching face 62e of the hook member 6 and the hitched face 22e of the tool holder 22 slide with inclination on the longitudinal face parallel to the holder sliding direction Y, and contact straight on the cross-sectional face parallel to the holder sliding direction Y.

Further, on the longitudinal face parallel to the holder sliding direction Y, the pressing face 32a of the pressing member 3, the pressure-receiving face 22a and the hitched face 22e of the tool holder 22, and the hitching face 62e of the hook member 6 are set to be parallel. That is to say, the first inclination angle θa, the second inclination angle θb, the third inclination angle θc, and the fourth inclination angle θd are set to be the same angle.

As shown in FIG. 3, the sliding mechanism 5 is provided with a bearing 51 mounted to the sliding member 31, a cylindrical member 52 mounted to an outer ring of the bearing 51 and having a male screw portion 52a on the peripheral face, a worm wheel 53 having a female screw portion 53a to screw to the male screw portion 52a of the cylindrical member 52 and a gear portion 53b on the peripheral face, and a worm member 54 to engage to the gear portion 53b of the worm wheel 53.

The sliding mechanism 5 is constructed as that the worm wheel 53 is rotated around the rotation axis La by rotation of the worm member 54, the cylindrical member 52 is moved in the axial direction X by screwing process, and the pressing member 3 (the sliding member 31 and the pressing ring 32) is slid in the axial direction X by transmission of the force in the axial direction X to the pressing member 3 (the sliding member 31) through the bearing 51.

And, in the rotating state of the rotation cylinder 1, the pressing member 3 and an inner ring of the bearing rotate, the outer ring of the bearing 51, the cylindrical member 52, the worm wheel 53, and the worm member 54 do not receive the rotational force from the rotation cylinder (not rotate).

Next, the function of the peeling machine of the present invention is described.

When the pressing member 3 is moved to the axial outer side Xa by the sliding mechanism 5, the pressing face 32a of the pressing member 3 (the pressing ring 32) slides on the pressure-receiving face 22a of the tool holder 22, further, the pressing face 32a presses the pressure-receiving face 22a to the radial inner side Rb. And, although the hook member 6 is moved unitedly (together) with the pressing member 3 to the axial outer side Xa and the hitching face 62e of the hook member 6 slides on the hitched face 22e of the tool holder 22, pressing force is not generated.

On the longitudinal face parallel to the holder sliding direction Y, the sliding force to the axial outer side Xa is converted to the pressing force to the radial inner side Rb by the sliding of the pressing face 32a of the pressing member 3 and the pressure-receiving face 22a of the tool holder 22 with inclination (taper) to move the tool holder 22 to the radial inner side Rb. In other words, the tool holder 22 (the edge of the cutting tip 23 attached to the tool holder 22) is moved close to the rotation axis La or the work W.

When the pressing member 3 is moved to the axial inner side Xb by the sliding mechanism 5, the hook member 6 is also moved together to the axial inner side Xb, the hitching face 62e of the hook member 6 slides on the hitched face 22e of the tool holder 22, further, the hitching face 62e presses the hitched face 22e to the radial outer side Ra. And, although the pressing face 32a of the pressing member 3 slides on the pressure-receiving face 22a of the tool holder 22, pressing force is not generated.

On the longitudinal face parallel to the holder sliding direction Y, the sliding force to the axial inner side Xb is converted to the pressing force to the radial outer side Ra by the sliding of the hitching face 62a of the hook member 6 and the hitched face 22e of the tool holder 22 with inclination to move the tool holder 22 to the radial outer side Ra. In other words, the tool holder (the edge of the cutting tip 23 attached to the tool holder 22) is moved apart from the rotation axis La or the work W.

And, as shown in FIG. 5 and FIG. 6, the hitched portion 22f of the tool holder 22, sliding on the pressing ring 32 of the pressing member 3 and the hitching portion 62 of the hook member 6, is held by the pressing ring 32 of the pressing member 3 and the hitching portion 62 of the hook member 6 in the holder sliding direction Y. Therefore, stagger in the holder sliding direction Y is prevented, adding to the movement by self weight in the rotation stop state, the movement to the radial outer side Ra by centrifugal force in the rotating state is also prevented, and positioning of the tool holder 22, namely, position adjustment of the cutting tip 23 in the diameter direction is stably conducted with high accuracy.

In the present invention, being modifiable, although two hook members 6 are hitched to one tool holder 22 in figures, only one hook member 6 may be hitched to the tool holder 22. And, although four cutting units 20 (the tool holders 22) are disposed on the base member 21, more than four units, for example, six units may be disposed. The construction of the sliding mechanism 5, not restricted to the above-described worm type, may be a construction with actuators.

Figure 7:
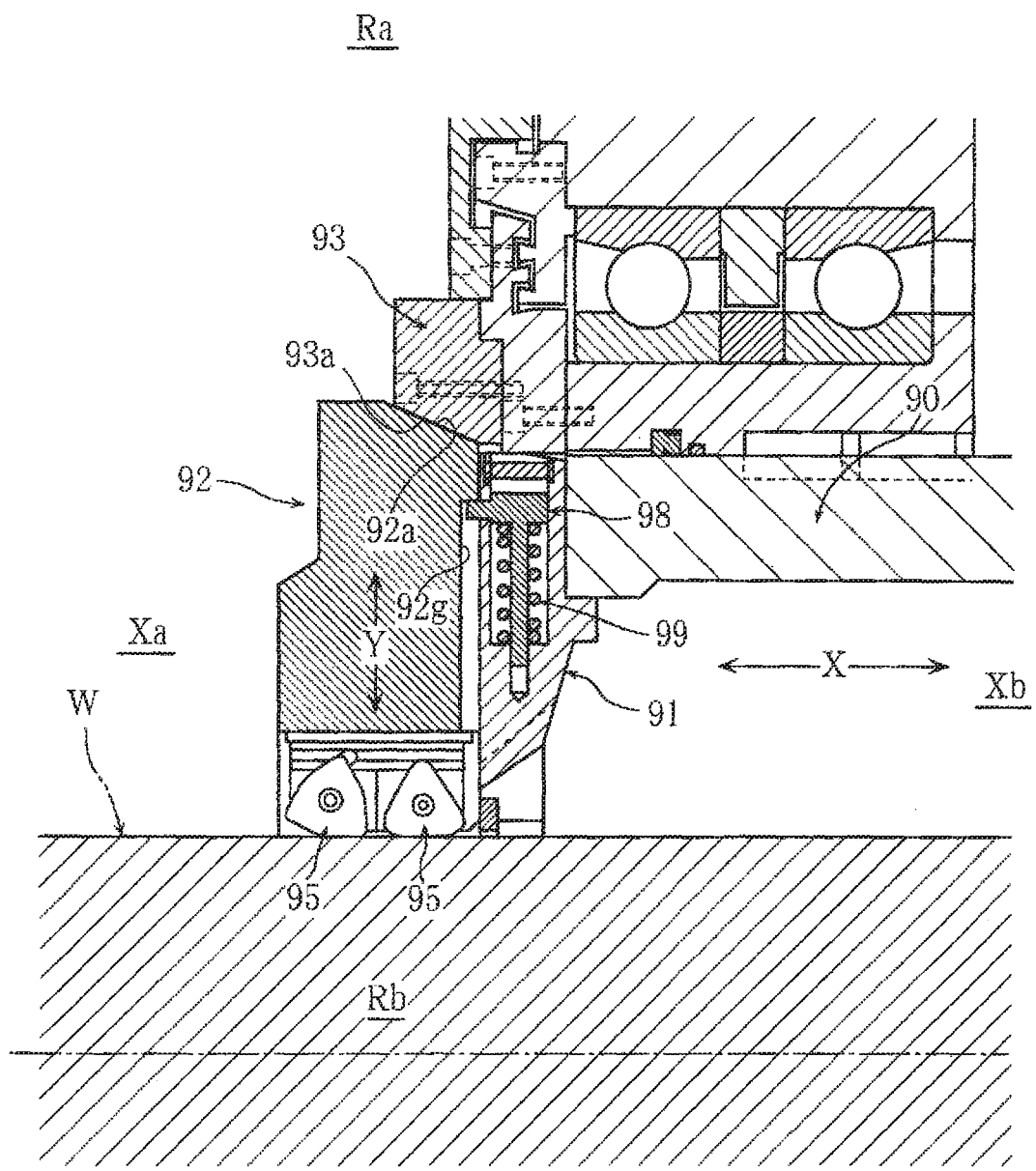
FIG. 7 A longitudinal cross-sectional view to explain a conventional peeling machine.

As described above, in comparison with the conventional elastic pressing type using the spiral spring 99 as shown in FIG. 7, the sliding of the tool holder 22 can be made smooth and stable, production process such as adjustment of the sliding resistance of the tool holder 22 and cutting preparation work can be conducted easily and swiftly because in the peeling machine of the present invention provided with the rotation cylinder 1 to which the work W of round rod is inserted, the tool holder 22 attached to the rotation cylinder 1 as to freely slide along the radial direction R of the rotation cylinder 1, and the pressing member 3 attached to the rotation cylinder as to freely slide along the axial direction X of the rotation cylinder 1; and constructed as that the pressing face 32a of the pressing member 3 and a pressure-receiving face 22a of the tool holder 22 are made sliding with inclination on the longitudinal face parallel to the sliding direction Y of the tool holder 22, and the tool holder 22 is made sliding to the radial inner side Rb on the longitudinal face by sliding the pressing member 3 to the axial outer side Xa; and, the hook member 6, hitching the tool holder 22 as to prevent sliding of the tool holder 22 to the radial inner side Rb by self weight, is attached to the pressing member 3. Durability of the tool holder 22 and the pressing member 3 can be improved because it is unnecessary to press the tool holder 22 with strong force to slide. The disadvantage generated by the movement of the tool holder 22 to the radial inner side Rb by self weight can be certainly prevented, the tool holder 22 is certainly moved (escaped) to the radial outer side Ra, and the working can be made safe. Especially, the present invention is appropriate for a large peeling machine which cuts the work W of which diameter is equal to or more than 100 mm, and for a large peeling machine in which heavy tool holders 22 more than 10 kg are used.

And, the tool holder 22 can be smoothly slid without torsion because the tool holder 22 has the hitched face 22e hitched to the hook member 6 parallel to the pressure-receiving face 22a on the longitudinal face. Positional deviation by stagger of the tool holder 22 in the sliding direction Y is prevented, and the edge position of the cutting tip 23 can be adjusted with high accuracy.

And, the tool holder 22 is held in the sliding direction Y, positional deviation by stagger of the tool holder 22 in the sliding direction Y is prevented, and the edge position of the cutting tip 23 can be adjusted with high accuracy because the hook member 6 has the hitching face 62e hitched to the tool holder 22 and parallel to the pressing face 32a of the pressing member 3 on the longitudinal face.

EXPLANATION OF THE MARKS

1 A rotation cylinder
3 A pressing member
6 A hook member
22 A tool holder
22a A pressure-receiving face
22e A hitched face
32a A pressing face
62e A hitching face
R A radial direction
Rb A radial inner side
W A work
X An axial direction
Xa An axial outer side
Y A sliding direction

The invention claimed is:

1. A peeling machine provided with a rotation cylinder (1) to which a work (W) of round rod is inserted, a tool holder (22) attached to the rotation cylinder (1) as to slide along a radial direction (R) of the rotation cylinder (1), and a pressing member (3) attached to the rotation cylinder (1) as to slide along an axial direction (X) of the rotation cylinder (1); and constructed so that a pressing face (32a) of the pressing member (3) and a pressure-receiving face (22a) of the tool holder (22), provided on a base end side of the tool holder (22), slide with inclination on a plane cut on a longitudinal face parallel to a sliding direction (Y) of the tool holder (22) an including an axis (La) of the rotation cylinder (1) wherein the tool holder (22) slides to a radial inner side (Rb) of the rotational cylinder on the longitudinal face by sliding the pressing member (3) to an axial outer side (Xa) of the rotational cylinder;

characterized by that:

a hook member (6) is attached to the pressing member (3), the hook member (6) hitching the tool holder (22) so as to prevent it from sliding to the radial inner side (Rb) of the rotational cylinder by self weight.

2. The peeling machine as set forth in claim 1, wherein the tool holder (22) has a hitched face (22e) hitched to the hook member (6) parallel to the pressure-receiving face (22a) on the longitudinal face.

3. The peeling machine as set forth in claim 1, wherein the hook member (6) has a hitching face (62e) hitched to the tool holder (22) and parallel to the pressing face (32a) of the pressing member (3) on the longitudinal face.

4. The peeling machine as set forth in claim 2, wherein the hook member (6) has a hitching face (62e) hitched to the tool holder (22) and parallel to the pressing face (32a) of the pressing member (3) on the longitudinal face.

* * * * *